United States Patent

[11] 3,525,362

[72] Inventors Walter Henry Briggs
Severnstoke, Worcestershire, England
Benjamin Ward, Rednal, near
Birmingham, England
[21] Appl. No. 723,145
[22] Filed April 22, 1968
[45] Patented Aug. 25, 1970
[73] Assignee Burman & Sons Limited
Birmingham, England
[32] Priority May 8, 1967
[33] Great Britain
[31] 21,329/67

[54] RACK AND PINION STEERING GEAR
1 Claim, 4 Drawing Figs.
[52] U.S. Cl. ..................................... 137/625.24,
91/375
[51] Int. Cl. ..................................... F15b 9/10,
F16k 11/12
[50] Field of Search............................. 91/375A;
137/625.21 (Cursory), 625.24 (Cursory), 625.22

[56] References Cited
UNITED STATES PATENTS

| | | | |
|---|---|---|---|
| 2,946,348 | 7/1960 | North............................ | 137/625.21 |
| 2,988,059 | 6/1961 | Wysong........................ | 91/375(A)UX |
| 3,033,051 | 5/1962 | Reinke et al................. | 91/375(A)UX |
| 3,296,940 | 1/1967 | Eddy et al.................... | 91/375(A)UX |

*Primary Examiner*— M. Cary Nelson
*Assistant Examiner*— Robert J. Miller
*Attorney*—Holman, Glascock, Downing and Seebold ABSTRACT: A rack and pinion steering gear of the kind having hydraulically actuable means for assisting operation of the gear wherein there is provided a control valve for said means, said control valve comprising a pair of co-axial valve members which are interconnected by a torsion bar, one valve member being rotatable in use by the driver of the vehicle in which the steering gear is mounted and the other valve member being connected to the pinion of the steering gear.

Patented Aug. 25, 1970 3,525,362
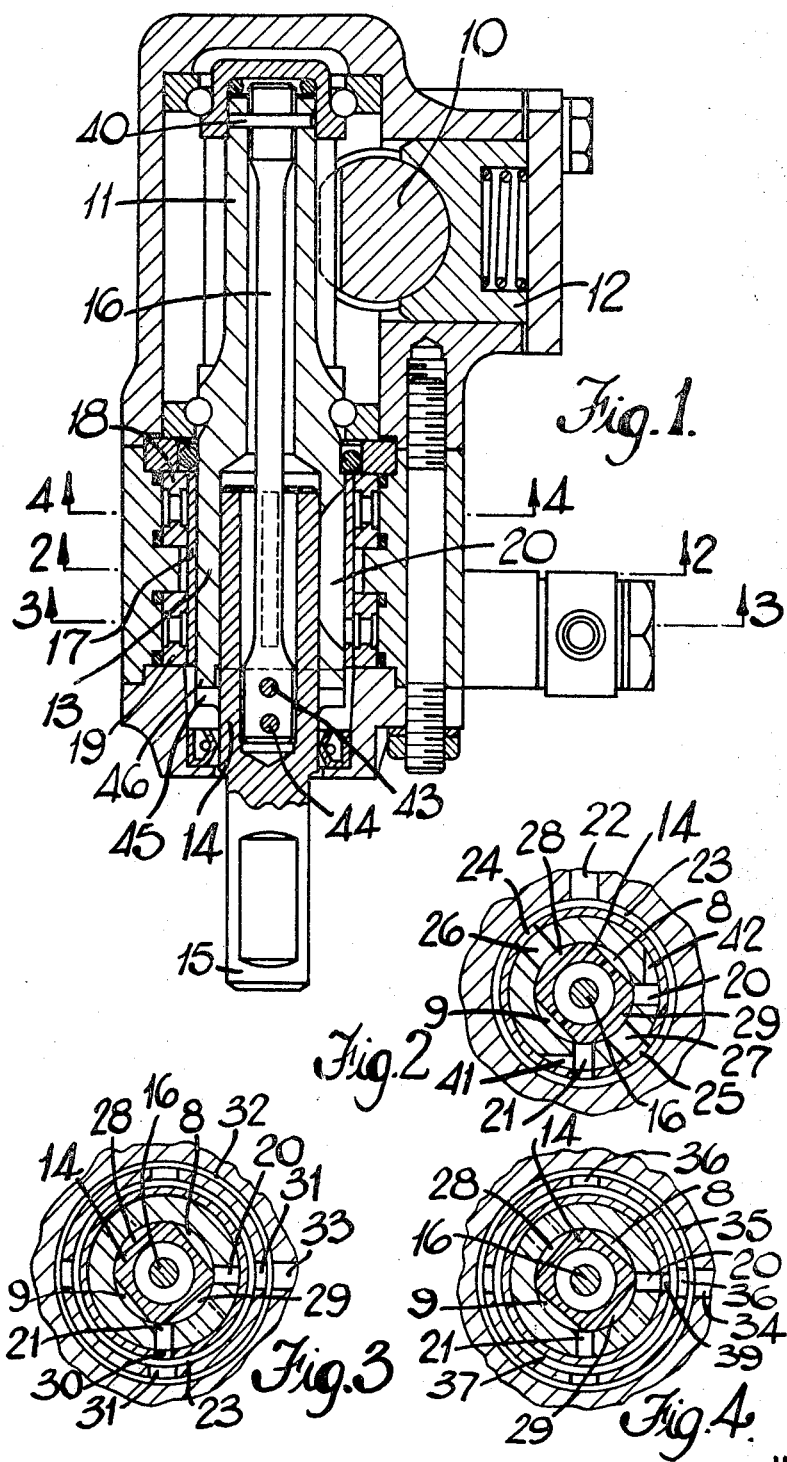
INVENTOR
Walter Henry Briggs & Benjamin Ward
BY Glascock, Downing
& Seebold.
ATTORNEYS

RACK AND PINION STEERING GEAR

This invention relates to rack and pinion steering gear of the kind having hydraulically actuable means for assisting operation of the gear, one object of the invention being to provide in a steering gear of this kind an improved form of valve for controlling the operation of said hydraulically actuable means.

In accordance with the invention a rack and pinion steering gear of the kind specified is provided with a control valve for said hydraulically actuable means which comprises a pair of co-axial valve members which are arranged so that one member extends into the other, one of said valve members being rotatable in use by the driver of the vehicle in which the steering gear is mounted and the other valve member forming or being connected to the pinion of the steering gear, said members being themselves interconnected by means of a torsion bar which permits angular movement of one member relative to the other.

The invention will now be described by way of example with reference to the accompanying drawing wherein:

FIG. 1 is a sectional view through a rack and pinion steering mechanism and control valve constructed in accordance with the invention, FIG. 2 is a section on the line 2-2 of FIG. 1 (the valve being in a central or neutral position), FIG. 3 is a section on the line 3-3 (the valve having been rotated clockwise), and FIG. 4 is a section on the line 4-4 (the valve having been rotated anti-clockwise).

Referring firstly to FIG. 1 the mechanism includes a rack 10 which is maintained in engagement with a pinion 11 by means of a spring-loaded slipper pad 12. The pinion 11 is extended at one end to provide an outer valve member 13 into which an inner valve member 14 projects. The inner valve member 14 is adapted to be connected at end 15 to a spindle (not shown) which in use would be rotatable by the driver of the vehicle in which the mechanism is mounted and as shown in FIGS. 2, 3 and 4 said inner member 14 has an external periphery of generally square cross-section, the interior of said member being hollow. There is also provided a torsion bar 16 which is connected at its two ends respectively to the two valve members 11 (forming a continuation of the member 13) and 14.

Around the exterior of the valve member 13 is mounted a sleeve 17 and on the exterior of said sleeve is mounted a pair of annular sealing members 18 and 19. Furthermore, the valve member 13 is provided with two slots 20 and 21 which each extend through its wall, the slot 20 being seen particularly in FIG. 1 whereas both slots (which are spaced apart by an angle of 90°) are seen in FIGS. 2, 3 and 4.

Referring now to FIG. 2 high pressure oil from an engine-driven pump (not shown) is supplied to a port 22 formed in the valve housing and from this port high pressure fluid passes into the annulus 23 and thence through two ports 24 and 25 formed in the sleeve 17 into ports 26 and 27 formed in the valve member 13 so as to be admitted to spaces 28 and 29 formed between the interior of the outer valve member 13 and one pair of opposite sides of the inner valve member 14. These spaces 28 and 29 will thus be filled with high pressure oil and in the neutral or central position of the valve as shown in FIG. 2 the high pressure oil will be able to flow freely into the slots 20 and 21, and spaces 8 and 9 and thence to a tank or reservoir via two slots formed in the valve member periphery.

Referring now to FIG. 3 if the inner valve member 14 is turned in a clockwise direction as seen in the figure, high pressure oil from the space 29 will be able to enter the slot 21 and will then pass via port 30 in the sleeve 17 and into the annulus 23 from whence it will pass via further ports 31 into an annulus 32 and thence to a port 33 in the housing which is connected to one end of an hydraulically actuated piston and cylinder means (not shown) assisting movement of the rack.

Thus the piston of said means can be mounted on an extension of the rack whereas the cylinder is formed by a tube in which the rack is enclosed. High pressure oil will thus be admitted to one end of said cylinder whilst return oil from the other end of the cylinder would enter port 34 (see FIG. 4) formed in the housing and thence into annulus 35 through ports 36 into annulus 37 from where it will flow through the slot 20 and round one edge of the inner valve member 14 to the low pressure spaces 8 and 9 between the interior of the outer valve member 13 and a pair of opposite sides of the inner valve member. From said low pressure spaces the oil or other fluid can return to the tank or reservoir. It will, of course, be appreciated that when considering the action of the valve as shown in FIG. 3 the orientation of the valve in FIG. 4 would have to be altered to correspond with that shown in FIG. 3.

Similarly, referring to FIG. 4 which shows the valve rotated in an anti-clockwise direction high pressure oil or fluid admitted to the space 29 will be able to flow via the slot 20, port 39, annulus 37, ports 36 and annulus 35 to port 34 which will thus lead high pressure oil to that end of the cylinder opposite to that receiving the high pressure oil when the valve is turned in a clockwise direction. Looking now at FIG. 3 and imagining the valve shown therein also to be rotated in an anti-clockwise direction, the low pressure oil on the opposite end of the cylinder will return via port 33 into annulus 32 and thence through ports 31 into annulus 23, port 30 and into the slot 21 to which leads to the tank or reservoir, via the slots in the valve member periphery previously mentioned.

In assembling the two valve members 13 and 14 and torsion bar 16 the torsion bar is first of all secured at one end to the valve member 13 by means of a pin 40. The inner valve member 14 is then turned until a straight-edged member (not shown) can be inserted through the slots 20 and 21 in the outer valve member 13, portions of the outer surface of said outer valve member being cut away at positions adjacent to and extending into said slots 20 and 21 on that side of each slot remote from the other slot as indicated by reference numerals 41 and 42 in FIG. 2. Said straight-edged member will engage one side of the inner valve member 14 so that the latter will be correctly located relative to the outer member 13. The other end of the torsion bar 16 can then be secured to the inner valve member 14 by means of pins 43 and 44. It will, of course, be appreciated that turning of the valve member 14 by the driver of the vehicle will initially stress the torsion bar 16 and at the same time operate the valve to actuate the piston and cylinder means. When the rack moves the pinion 11 will also rotate to relieve the stress in the torsion bar, thus restoring the two valve members to a relative position in which no further steering action occurs unless the steering wheel is rotated further in the same direction or in the opposite direction. Furthermore, should the torsion bar break or the hydraulic supply fail dogs 45 and 46 formed respectively on the inner and outer valve members will engage to provide for a manual operation of the mechanism.

We claim:

1. A fluid power steering control valve for a rack and pinion steering gear comprising a pair of co-axial valve members arranged so that one member extends into the other, one of said valve members being rotatable in use by the driver of a vehicle in which the steering gear is mounted, the valve members being interconnected by means of a torsion bar which permits angular movement of one valve member relative to the other, the inner valve member being of rectangular configuration in cross-section, and the outer valve member being formed with a pair of slots which are spaced apart by an angle of 90° and which each extend through the wall of said outer valve member, portions of the outer surface of the outer valve member being cut away at positions adjacent to and extending into said slots on that side of each slot remote from the other slot.